W. B. Le NOIR & R. P. CHUNN.
Attachment to Balances.

No. 226,083    Patented Mar. 30. 1880.

Attest:
C. Clarence Poole
Lw Seely

Inventor:
William B. Le Noir,
Robert P. Chunn,
by Ellis Spear
Attorney

UNITED STATES PATENT OFFICE.

WILLIAM B. LE NOIR AND ROBERT P. CHUNN, OF LOWER PEACH TREE, ALABAMA; SAID CHUNN ASSIGNOR TO SAID LE NOIR.

ATTACHMENT TO BALANCES.

SPECIFICATION forming part of Letters Patent No. 226,083, dated March 30, 1880.

Application filed September 15, 1879.

*To all whom it may concern:*

Be it known that we, WILLIAM B. LE NOIR and ROBERT P. CHUNN, of Lower Peach Tree, Wilcox county, Alabama, have invented an Improvement in Attachments to Scales, of which the following is a specification.

The object of our invention is an improved attachment for weighing-scales by means of which a more accurate estimate may be made of the proper weight to be cut off the bulk of an article, and the inconvenience of carrying such article from the cutting-block to the scales (often a considerable distance) entirely avoided.

In weighing such articles the present practice is to estimate by eye the quantity required to make a certain weight, and if, as is usually the case, the estimate is not accurate, the piece has to be trimmed or reduced to proper size. This necessarily causes a transfer of the article from the cutting-block to the scales, and vice versa, and involves a certain amount of waste, which, in course of time, becomes an appreciable item of loss, and is also exceedingly inconvenient.

Our invention consists in attaching to the movable platform of a scale an auxiliary platform which is stationary, and arranging a cutting-knife at the point of juncture, in the manner and adapted to be used for the purpose hereinafter described.

Figure 1:
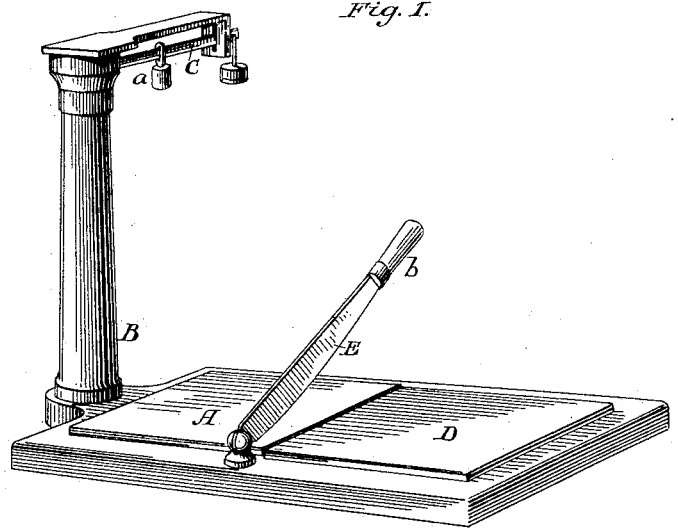
Figure 2:
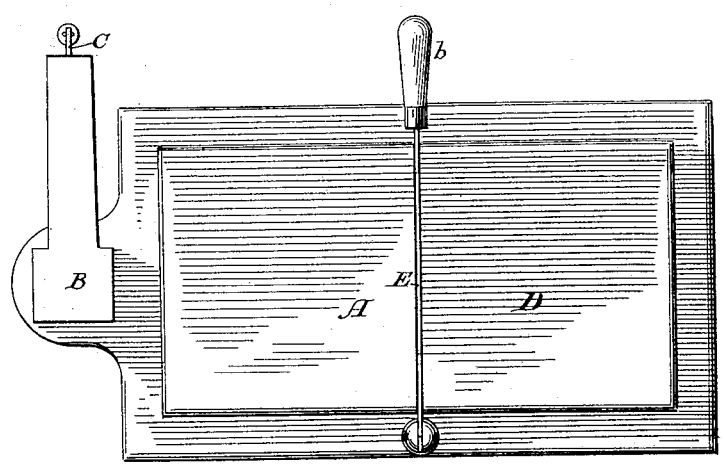

In the drawings accompanying this specification, Figure 1 is a perspective view, and Fig. 2 a plan.

In the drawings, A represents the movable platform of a scale, which is constructed according to any of the well-known ways of building scales now in use. B is the scale-standard, and C the beam, carrying the weight $a$, as usual, and graduated in any desired manner.

D is an auxiliary platform, which may be extended so as to inclose the movable platform, or may be simply placed in close proximity to it. We prefer the latter method in attaching the platform to scales now in use. The former is to be used in building new scales intended to contain our invention.

The platform D is fixed, and its top is level with that of the other platform when not depressed in weighing.

At the junction of the two platforms, and on one side, is pivoted the cutting-knife E in any one suitable manner, preferably with a universal joint, so that it may be moved horizontally as well as vertically. It is operated by a handle, $b$, and is adapted to give a draw-cut over toward the opposite side of the platform to that on which it is pivoted.

In operation, supposing it were desired to weigh and cut off a piece weighing two pounds from a large cheese, the bulk of the article is placed on the platform D, the weight on the scale-beam placed at 2, and the cheese gradually moved onto the platform A until the weigher judges that sufficient cheese is on such platform. The knife is then used to separate the piece, which is then in position to be accurately weighed without loss of time by the inconvenience of carrying the article back and forth from cutting-block to weighing-scale. This method of using the scales does not, of course, impair their efficiency for other purposes when it is not necessary to use the knife or fixed platform.

Among the advantages of our device is the convenience of having the knife always at hand and attached to the scale ready for cutting the article, so that it is not necessary to remove the bulk in cutting off the piece. Further, by means of the fixed platform for supporting the article to be cut, adjustment of the exact weight is more easily ascertained and the inconvenience of going from the scales to the cutting-block avoided.

What we claim, and desire to secure by Letters Patent, is—

1. The combination, with a scale, of an auxiliary fixed platform, substantially as described and shown.

2. The combination, with a scale, of an auxiliary fixed platform and a cutting-knife, substantially as and for the purposes set forth.

In testimony whereof we have signed our names to this specification in the presence of two subscribing witnesses.

WILLIAM B. LE NOIR.
ROBERT P. CHUNN.

Witnesses:
K. A. MAYER,
Q. D. LINDSEY.